Aug. 27, 1963    G. C. BRITTEN    3,101,901
BLOW-PIPE FOR FABRICATING PLASTIC RESIN ARTICLES
Filed April 28, 1961

INVENTOR.
GEORGE C. BRITTEN
BY Krazinski + Nolan
ATTORNEYS

United States Patent Office 3,101,901
Patented Aug. 27, 1963

3,101,901
BLOW-PIPE FOR FABRICATING PLASTIC RESIN ARTICLES
George C. Britten, 311 Bay Drive, Massapequa, N.Y.
Filed Apr. 28, 1961, Ser. No. 106,263
8 Claims. (Cl. 239—132)

The present invention relates to the fabrication of hollow articles formed of plastic resin in a blow mold and, more particularly, to an improved blow-pipe for blowing a charge of plastic resin into the mold to form the article.

At present machines are utilized for blowing plastic resin articles of various plastic compositions, such as polyethylene and the like, which machines generally comprise a blow-pipe, a mold for forming a charge of warm plastic resin on the blow-pipe, and a second mold in which the charge is blown to form an article, such as a bottle, jar, vial or the like.

The conventional blow-pipe for such machines comprises a tube having an open end formed with a seat which is positioned in the blow mold with the charge thereon, and a valve member for the seat adapted to be mechanically actuated to move outwardly off its seat and introduce air under pressure within the charge for blowing the charge to form the article in the mold.

Such a valving arrangement for blow-pipes has been found to have a number of disadvantages. As the valve member is moved to unseat itself, the head of the valve member moves the plastic charge with it about 0.050 inch which causes the resin to stretch, makes it thinner and sets up stresses in the bottom of the blown hollow article. Also, as the valve member is unseated to introduce the air, there is a sudden rush of freely flowing air having a lower temperature than that of the plastic charge and thereby causes the charge to chill too rapidly thus setting up "crazing" and the resulting formation of improperly annealed articles.

Accordingly, an object of the present invention is to provide an improved blow-pipe for machines of the character indicated herein which overcomes the objections and disadvantages heretofore encountered.

Another object is to provide such a blow-pipe which does not require movable valving in the vicinity of the plastic charge.

Another object is to provide such a blow-pipe wherein the air is warmed sufficiently to prevent the plastic charge from being chilled.

Another object is to provide such a blow-pipe wherein the flow of air is at a uniform rate and sudden blasts of air are prevented.

Another object is to provide such a blow-pipe which is cooled sufficiently to prevent the plastic charge from adhering thereto when the air is effective to form the article in the mold.

Another object is to provide such a blow-pipe which controls the growth of the charge as it is being blown within the mold.

Another object is to provide such a blow-pipe wherein the plastic charge is prevented from blocking air passages within the blow-pipe.

A further object is to provide such blow-pipes which can be installed in existing machines.

A still further object is to accomplish the foregoing in a simple, practical, reliable and economical manner.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 2:
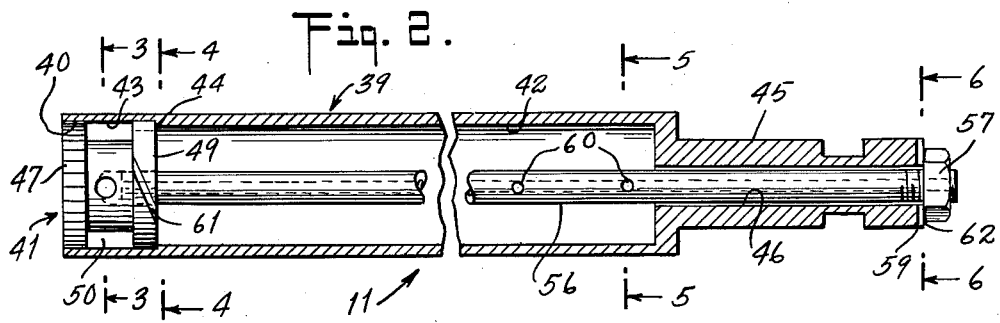
FIG. 2 is an enlarged fragmentary longitudinal sectional view of a blow-pipe in accordance with the present invention.
Figure 6:
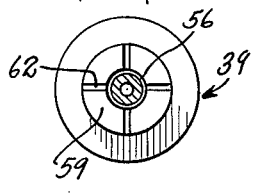
Figure 4:
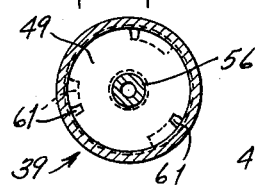
Figure 5:
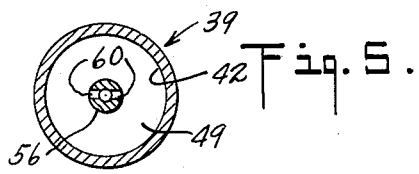

FIGS. 4, 5 and 6 are sectional views taken along the lines 4—4, 5—5 and 6—6, respectively, on FIG. 2, illustrating other details of the blow-pipe.

Figure 1:
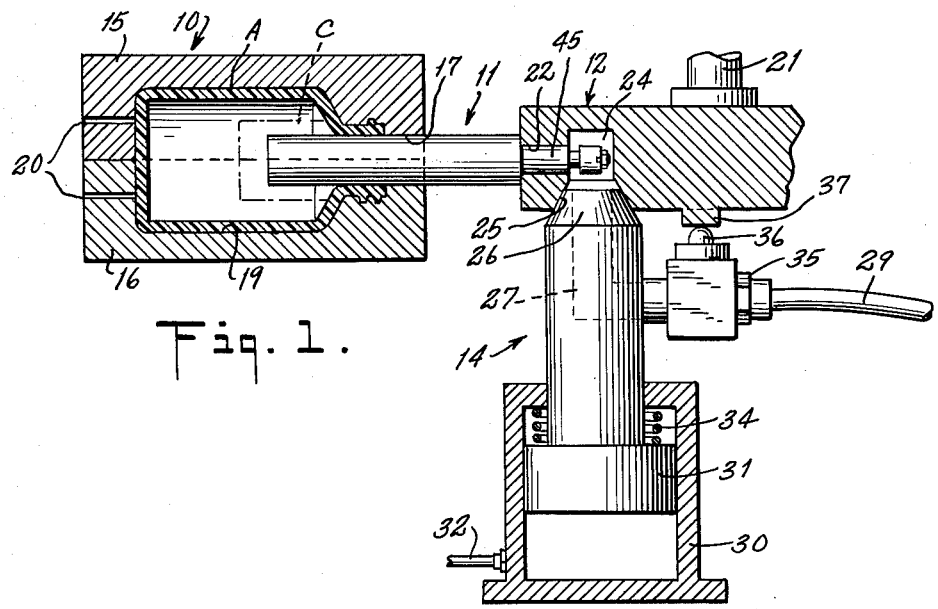
FIG. 1 is a fragmentary sectional view of a machine for fabricating hollow articles formed of plastic resin, illustrating the blow mold, the blow-pipe and conventional controls for supplying air through the blow-pipe.

Referring now to FIG. 1 of the drawing in detail, a portion of a more or less conventional hollow plastic resin article fabricating machine is shown, which machine generally comprises a blow mold 10 in which a hollow article A is blown, a blow-pipe 11 on which a plastic charge of resin C is supported, a head 12 for supporting the blow-pipe and positioning it at various stations of the machine, and mechanism 14 controlled by the head 12 and cooperating therewith to supply air under pressure to the blow-pipe 11.

The blow mold 10 includes a pair of complementary mold members 15 and 16 adapted to be opened and closed by conventional mechanism (not shown). The mold members provide an opening 17 for receiving the free or outer end of the blow-pipe 11, a cavity 19 including a threaded neck section and a body section shaped and dimensioned to form the article A, and vent openings 20 opposite the opening 17 for relieving air in the mold cavity as the article is being blown.

The head 12 is mounted for rotation on a shaft 21 and has a bore 22 for mounting the inner end of the blow-pipe 11, which bore communicates with a bore 24 having a flared downwardly facing seat 25 (as viewed).

The mechanism 14 comprises a nozzle 26 shaped to fit the seat 25 and formed with a passageway 27 in communication with an air supply line 29, a cylinder 30, a piston 31 in the cylinder on which the nozzle 26 is mounted, a conduit 32 for supplying pressure medium to the cylinder by valving (not shown) to raise the piston 31 and cause the nozzle 26 to engage its seat, and a return spring 34 for the piston. The supply of air under pressure to the nozzle 26 is controlled by a valve 35 in the line 29 which has a button 36 for engaging a cam 37 on the head 12 to effect opening of the valve 35.

In FIGS. 2 to 6, the blow-pipe 11 is shown in detail. It essentially comprises a tubular body 39 formed with an open end 40 adapted to extend through the mold opening 17 with a warm plastic charge of resin C (FIG. 1) thereon, and a head 41 fitted within the open end of the body. The head and body have passageway means for conducting air under pressure therethrough, the initial supply of air cooling the head and thereby preventing the charge C from adhering thereto. Since the tubular body 39 is warm, the air as it passes therethrough is warmed and thus the warmed air prevents chilling of the charge as it blows the charge within the mold 10 to form the article A. The passageway means at the head 41 are restricted at the downstream end thereof to prevent sudden blasts of air from distorting the charge in an undesirable manner.

In order to accomplish the foregoing, the tubular body 39 has a circular inner wall 42 formed with a shoulder 44 facing its open end, and a reduced portion 45 secured in the bore 22 of the head 12 and extending into the bore 24 of the head 12, the portion 45 being formed with a reduced bore 46 communicating with the bore 24.

Figure 3:
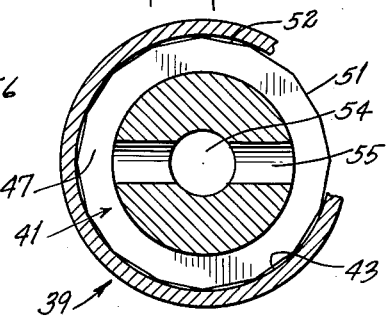
FIG. 3 is an enlarged sectional view taken along the line 3—3 on FIG. 2 illustrating important details of the blow-pipe.

The blow-pipe head 41 is generally cylindrical and has spaced apart outer and inner flanges 47 and 49 providing an annular chamber 50 therebetween. The inner flange 49 is seated and retained on the shoulder 44, as about to be described, and the outer flange 47 has a plurality of circumferentially extending flat faces 51 on the outer of peripheral wall thereof (FIG. 3). These faces cooperate with the adjacent inner wall 43 within the chamber 50 of the blow-pipe body 39 to provide a plurality of circumferentially arranged air passages 52 between the body 39 and the head 41 at the open end of the blow-pipe for restricted flow of air from the chamber 50 into the charge C. These passages are dimensioned to provide a uniform predetermined air flow for a given presure in the line 29 and to thereby promote the growth of a charge for forming an article of a particular size and shape in a uniform and predetermined manner. While the outer wall of the flange 47 could be circular and the faces 51 could be provided on the inner wall of the body 39, the arrangement illustrated herein is preferred because heads 41 having more or less faces 51 than shown can be used interchangeably to provide passages of different dimensions to give the most desirable air flow rate for an article of a particular shape and size.

For example, the passages 52 may have a radial dimension between midpoint of the faces 51 and the inner wall 42 of between about 0.002 and about 0.010 inch in a blow-pipe body bore having a diameter of one inch, whereby between about 15 and about 35 passages may be provided having a combined cross-sectional area of between about 0.050 and about 0.020 square inch, this combined area being greater as the number of faces is smaller. Even though the combined area of these passages is varied, the warmed air under pressure is applied at a location and a rate to expand the charge C into the mold in the most favorable manner to produce articles having the desired wall thickness.

The blow-pipe head 41 further has a central bore 54 extending to about the middle thereof and radial bores 55 (FIG. 3) for establishing communication between the bore 54 and the annular chamber 50. A tube 56 has one end in communication with the bore 54, extends through the bore portion 46, and has its other end in communication with the bore 24, whereby air under pressure can be supplied from the line 29 to the chamber 50 by the tube 56. Preferably, the outer end of the tube is secured in the bore 54, the inner end is externally threaded and a nut 57 is threaded on this inner end and against an inner end face 59 of the blow-pipe body to draw and retain the inner flange 49 against the shoulder 44.

The arrangement so far described produced excellent results which however can be improved upon by heat exchange of incoming air with the blow-pipe body 39 which is heated by the plastic charge C thereon. This is accomplished by providing restricted side openings 60 (FIGS. 2 and 5) in the tube 56 communicating with the bore thereof at its inner portion within the bore provided by the inner wall 42 of body 39, and by providing the inner flange 49 with restricted apertures 61 (FIGS. 2 and 4) for establishing communication between the bore of the body 39 and the annular chamber 50. In this manner, air enters the bore of the body 39 and contacts the warm inner wall 42 to be warmed thereby, the warm air enters the chamber 50 and passes through the passages 52 to be further warmed before it enters within the charge C. Such flow takes place after initial free flow has already taken place through the tube 56, which is spaced from and is out of heat exchange relation with the inner wall 42, to first effect cooling of the blow-pipe head 41 before pressure equilibrium between the chamber 50 and the bore of the body 39 has been established.

Also, additional air can be permitted to enter the bore of the blow-pipe body 39 from the bore 24 of the head by having the tube 56 fit loosely in the bore 46 and forming radial slots 62 in the end face 59 (FIGS. 2 and 6). The introduction of air in this manner establishes pressure equilibrium between the bore of the body 39 and the chamber 50 more rapidly.

From the foregoing description, it will be seen that the present invention provides an improved blow-pipe for fabricating plastic resin articles, which pipe is not subject to the prior disadvantages and objections of conventional blow-pipes, but yet is simple and economical in construction; it lends itself to interchangeable use of restricted flow controlling head; and it can be installed in existing machines without altering the elements of such machines.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A blow-pipe for fabricating hollow articles formed of plastic resin, which blow-pipe comprises a tubular body formed with an open end adapted to carry a charge of plastic resin thereon, a head fitted within the open end of said body, the inner peripheral surface of said body and the outer peripheral surface of said head at said open end being cylindrical and constructed and arranged to provide a plurality of circumferentially spaced restricted openings between said surfaces, said head including a pair of spaced flanges constructed and arranged to provide an annular chamber within said body inward of and in fluid flow communication with said openings, said head having passageway means extending therethrough and in fluid flow communication with said chamber, and means for supplying air under pressure to said passageway means, whereby the air enters said chamber and flows through said openings to blow the charge.

2. A blow-pipe according to claim 1, including restricted fluid conducting passageway means in flow communication with said chamber and in heat exchange relation with said body inward of said chamber.

3. A blow-pipe for fabricating hollow articles formed of plastic resin, which blow-pipe comprises a tubular body having an open end, a head having spaced apart inner and outer flanges fitted within the open end of said body to provide an annular chamber therebetween and having passageway means extending from its inner end to said chamber, the outer surface of said outer flange and the inner surface of said body at said open end being constructed and arranged to provide a plurality of circumferentially spaced restricted openings in fluid flow communication with said chamber, and a tube extending into said body from the end opposite its open end, said tube having one end connected in fluid flow communication with the inner end of said passageway means and having its other end open for connection with a supply of air under pressure.

4. A blow-pipe according to claim 3, wherein said tube and the inner wall of said body are positioned to provide a space therebetween, said tube has aperture means between the ends thereof in communication with said space, and said inner flange has aperture means for establishing restricted flow communication between said space and said chamber.

5. A blow-pipe according to claim 3, wherein said tube and the inner wall of said body are positioned to provide a space therebetween and restricted flow conducting means are provided between said tube and said body in communication with said space and adapted for connection to the supply of air under pressure, and said inner flange has aperture means for establishing restricted flow communication between said space and said chamber.

6. A blow-pipe according to claim 3, wherein said body has an outwardly facing shoulder on its inner wall for seating said inner flange, said tube is secured to said head, and means are provided at the open end of said tube for cooperating with said tube and said body to maintain said inner flange on said shoulder.

7. A blow-pipe for fabricating hollow articles formed of plastic resin, which blow-pipe comprises a tubular body member having an open end, a cylindrical head member fitted within the open end of said body member, one of said members having a generally circular wall facing the other member and said other member having a wall formed with a plurality of circumferentially extending faces facing the circular wall to provide a plurality of restricted openings between the walls, and tubular means within said body member for conducting air under pressure to said openings.

8. A blow-pipe according to claim 7, wherein said body member has a circular inner wall and said head member has said faces formed on the outer wall thereof.

References Cited in the file of this patent

UNITED STATES PATENTS

| | | |
|---|---|---|
| 2,752,201 | Blass | June 26, 1956 |
| 2,789,313 | Knowles | Apr. 23, 1957 |
| 3,019,481 | Negoro | Feb. 6, 1962 |

FOREIGN PATENTS

| | | |
|---|---|---|
| 581,713 | Great Britain | Oct. 22, 1946 |